US006848622B2

(12) United States Patent
Kudo et al.

(10) Patent No.: US 6,848,622 B2
(45) Date of Patent: Feb. 1, 2005

(54) PLASTIC CARD (75) Inventors: Takao Kudo, Miyagi (JP); Shinichi Matsumura, Miyagi (JP); Satoko Asaoka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/415,918

(22) PCT Filed: Sep. 3, 2002

(86) PCT No.: PCT/JP02/08941

§ 371 (c)(1),
(2), (4) Date: May 2, 2003

(87) PCT Pub. No.: WO03/022574

PCT Pub. Date: Mar. 20, 2003

(65) Prior Publication Data

US 2004/0026518 A1 Feb. 12, 2004

(30) Foreign Application Priority Data

Sep. 5, 2001 (JP) .......................................... 2001-268532

(51) Int. Cl.[7] .............................................. G06K 19/06
(52) U.S. Cl. ....................... 235/492; 235/487; 235/488; 235/449; 235/451; 235/380
(58) Field of Search ................................. 235/380, 375, 235/449, 451, 492, 487, 488; 428/99, 195

(56) References Cited

U.S. PATENT DOCUMENTS 5,356,717 A * 10/1994 Choki et al. ............. 428/425.9
5,503,891 A * 4/1996 Marshall et al. ............... 428/99
5,679,440 A * 10/1997 Kubota ...................... 428/195.1
6,098,889 A * 8/2000 Ogawa et al. ............... 235/492

FOREIGN PATENT DOCUMENTS

| EP | 0 548 933 | | 6/1993 | |
| JP | 04348176 A | * | 12/1992 | ............ C09J/07/02 |
| JP | 05-139077 | | 6/1993 | |
| JP | 06-28660 | | 2/1994 | |
| JP | 09175062 A | * | 7/1997 | ........... B42D/15/10 |
| JP | 2001-96956 | | 4/2001 | |

* cited by examiner

Primary Examiner—Steven S. Paik
(74) Attorney, Agent, or Firm—Sonnenschein, Nath & Rosenthal LLP (57) ABSTRACT

In a plastic card (10) for an embossing finish comprising a core material (12) and a sheath material (13), a breaking elongation of the core material (12) is 25% or less and a breaking elongation of the sheath material (13) is 130% or more. The ratio of the thickness of the core material to the thickness of the sheath material (13) occupied in the entire part of the plastic card is set to 20 to 53:10. Otherwise, a breaking elongation of the core material (12) is 50% or less and the tensile strength of the sheath material (13) is 100 MPa or more. The ratio of the thickness of the sheath material (13) to the thickness of the core material (12) occupied in the entire part of the card is set to 41 to 90:10. The breaking elongation of the core material (12) and the sheath material (13) or the tensile strength of the sheath material (13), and the ratio of thickness of the core material (12) to the sheath material (13) are adjusted so that the plastic card excellent in embossing characteristics and hardly generating cracks due to a repetitive bending fatigue is provided.

19 Claims, 4 Drawing Sheets

PLASTIC CARD

RELATED APPLICATION DATA

The present application is based on International Application No. PCT/JP02/08941 filed Sep. 3, 2002 under 35 U.S.C. §371 and claims priority to Japanese Application No. 2000-268532 filed Sep. 5, 2001, which applications are incorporated herein by reference to the extent permitted by law.

BACKGROUND OF THE INVENTION

The present invention relates to a plastic card used for various kinds of cards such as a credit card, a cash card, a debit card, etc. and more particularly to a plastic card suitable for an embossing finish.

In recent years, card type storage media such as credit cards, ID cards, cash cards, debit cards include IC cards which contain therein IC (Integrated Circuit) chips such as a microprocessor, a RAM (Random Access Memory), a ROM (Read Only Memory), etc. as well as magnetic cards capable of magnetically recording information. The IC cards include non-contact type IC cards capable of receiving data from and transmitting data to a transmitting and receiving part of a reading device in a non-contact manner. The IC cards further include contact type IC cards capable of receiving data from and transmitting data to the transmitting and receiving part of the reading device in a contact manner. In any type of the IC cards, more information can be stored in the IC chips contained therein than in the magnetic cards, and further, the information can be advantageously stored in a state of higher safety than in the magnetic cards.

Most of the IC cards are made of a resin material such as plastic. In the IC chips contained in the IC cards, a card information such as personal names, registration numbers, code numbers, etc. are stored. The information stored in the IC cards can be read out by various kinds of reading devices. On the IC cards, the card information is partly displayed on the surfaces of the cards by what is called an embossing finish that, for instance, personal names or registration numbers are displayed by stamping embossed characters.

As materials for these cards, a vinyl chloride resin has been hitherto mainly used. The vinyl chloride card formed by the vinyl chloride resin is excellent in embossing characteristics, however, low in strength to repetitive bending. For instance, when a user employs the vinyl chloride card, the card may possibly crack. Thus, a card material has been studied instead of vinyl chloride, however, an adequately satisfactory material has not been found yet under existing circumstance.

SUMMARY OF THE INVENTION

The present invention is devised by taking the above-described problem into consideration and it is an object of the present invention to provide a new plastic card using a non-vinyl chloride material.

Further, it is another object of the present invention to provide a plastic card on which the cracks of a card due to a repetitive bending fatigue are hardly generated, particularly to provide a plastic card having a repetitive bending resistance and excellent in its embossing characteristics.

Further, it is still another object of the present invention to provide a plastic card using a non-vinyl chloride material, having a repetitive bending resistance and excellent in embossing characteristics.

The present invention is based on the knowledge that the embossing characteristics and the strength to the repetitive bending have a relation opposed to each other. In other words, a material excellent in embossing characteristics is low in strength to repetitive bending. On the other hand, the card made of a material high in strength to repetitive bending is greatly bowed after the embossing finish. According to the present invention, materials having different characteristics are combined with each other for a core material and a sheath material of the card so that the plastic card excellent in embossing characteristics and a repetitive bending resistance is provided.

In the present invention, materials having different breaking elongation in a tensile test are used for the core material and the sheath material. Specifically, in the present invention, the sheath material has the breaking elongation higher than that of the core material. That is, the present invention concerns the plastic card having the core material and the sheath material. The breaking elongation of the core material is 25% or less and the breaking elongation of the sheath material is 130% or more and the ratio of the thickness of the core material relative to the thickness of the sheath material occupied in all of the card is set to 20 to 53:10. Thus, both the embossing characteristics and the repetitive bending resistance can be improved.

In the plastic card according to the present invention, the embossing finish may be applied to the sheath material and a magnetic stripe may be provided. Further, integrated circuit chips may be contained in the core material. Further, in the plastic card, the core material may have at least a pair of core sheets bonded through a circuit board and the sheath material may have at least a pair of outer layer sheets bonded through the core material. Still further, in the plastic card, the core material and the sheath material may be symmetrically disposed on the circuit board located as a center. Further, the core material and the sheath material of the present invention may be made of a non-vinyl chloride resin or a polymer alloy of a non-vinyl chloride resin including inorganic filler.

Further, the plastic card according to the present invention has core material layers provided on both the surfaces of a circuit board and sheath material layers provided outside of the core material layers. Each of the core material layers and the sheath material layers is made of a non-vinyl chloride resin or a polymer alloy of a non-vinyl chloride resin to which inorganic filler is added. The sheath material layer is thinner than the core material layer and has a breaking elongation higher than that of the core material layer and an embossing finish applied. Thus, both the embossing characteristics and the repetitive bending resistance can be improved. In the plastic card, the core material layer and the sheath material layer provided on one surface side and the core material layer and the sheath material layer provided on the other surface side may be symmetrically provided on the circuit board located as a center. In the plastic card according to the present invention, a magnetic stripe may be provided on the sheath material layer. Further, integrated circuit chips may be provided on the core material layer.

Further, the plastic card according to the present invention includes a core material and a sheath material. The breaking elongation of the core material is 50% or less and the tensile strength of the sheath material is 100 MPa or more and the ratio of the thickness of the core material relative to the thickness of the sheath material occupied in all of the card is set to 41 to 90:10. Thus, both the embossing characteristics and the repetitive bending resistance can be improved. In the plastic card according to the present invention, the core material may have at least a pair of core sheets bonded through a circuit board and the sheath material may have at least a pair of outer layer sheets bonded through the core material. Further, in the plastic card, the core material and the sheath material may be symmetrically disposed on the circuit board located as a center. Further, the core material and the sheath material may be made of a non-vinyl chloride resin or a polymer alloy of a non-vinyl chloride resin. Still further, the core material may be made of a non-vinyl chloride resin or a polymer alloy of a non-vinyl chloride resin including inorganic filler. The sheath material may be made of a drawn sheet of the non-vinyl chloride resin or the polymer alloy of the non-vinyl chloride resin. Further, in the plastic card according to the present invention, an embossing finish may be applied to the sheath material and a magnetic stripe may be provided on the sheath material. Furthermore, integrated circuit chips may be contained in the core material.

The above-described breaking elongation or the tensile strength changes depending on a material of the core material and the sheath material or the thickness of sheets forming the core material or the sheath material. In the plastic card according to the present invention, the ratio of the thickness of the core material to the sheath material is adjusted and the quality of the material of the core material and the sheath material is properly selected. Accordingly, the breaking elongation and the tensile strength can be set within a prescribed range.

The plastic card according to the present invention may be used as an embossed card that is subjected to an embossing finish and has card information stamped as embossed characters. Further, this plastic card may be also as a plastic card having no irregularities that the card information is recorded only in a magnetic stripe.

Still further objects, features or advantages of the present invention will become more apparent from a more detailed description based on Examples of the present invention described below or accompanying drawings.

DETAILED DESCRIPTION OF THE PRESENTLY PREFERRED EMBODIMENTS

Figure 1:
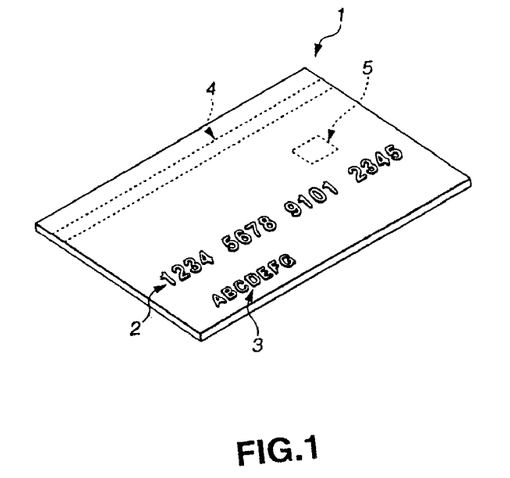
FIG. 1 is a perspective view of a plastic card to which the present invention is applied.

Now, a plastic card according to the present invention is described by referring to the drawings. As shown in FIG. 1, a plastic card 1 to which the present invention is applied is used as a credit card, a cash card, a debit card, an ID card, etc. This plastic card 1 is formed in a substantially rectangular shape. Card information is visually displayed on one surface of the card by an embossing finish and magnetically recorded on a magnetic stripe provided on each surface, and further recorded on IC chips contained therein.

Specifically, the plastic card 1 has, on the lower side of one surface, a first area 2 where the card information is recorded by the embossing finish. Further, a second area 3 is provided in the lower side of the first area 2. In the embossing finish, embossed characters can be pressed and the card information can be visibly recorded on the surface of the plastic card 1. In the first area 2, for instance, an ID number or the like is recorded. In the second area 3, for instance, the name or appellation of an owner, an expiration date, etc. is recorded.

Further, on the plastic card 1, a magnetic stripe 4 is provided along the longitudinal direction in the upper part of each surface. The magnetic stripe 4 is based on ISO/IEC7811 and is provided with a readable area and a recordable area. In the magnetic stripe 4, further detailed information such as a code number as well as the information recorded in the first area 2 and the second area 3 by the embossing finish is recorded. In the magnetic stripe 4, a high coercive magnetic material such as HiCo strong to an external magnetic field in which recording information is not erased is used.

Further, an IC chip 5 is contained in the plastic card 1. In the IC chip 5, a memory circuit for storing the card information or the like, a communication circuit for performing a data communication in contact or non-contact with a reading device, a control circuit for controlling an operation, etc. are incorporated. The IC chip 5 can record more information than the magnetic stripe 4. Further, information of high secrecy is encoded and recorded so that the safety of the information can be enhanced.

In the plastic card 1, information low in its secrecy and used frequently is visibly recorded in the first and second areas 2 and 3 by, for instance, an embossing finish and information high in its secrecy is recorded in the magnetic stripe 4 or the IC chip 5. That is, methods for recording the card information are different depending on kinds of information to improve maneuverability and the information high in its secrecy can be safely stored.

Now, the structure of the plastic card 1 as described above will be described by referring to FIG. 2. Each of the IC chips 5 and 5 is mounted on each surface of an antenna substrate 6. Here, antennas 6a and 6a are provided along outer peripheries on the antenna substrate 6. The IC chips 5 and 5 are mounted in prescribed areas of the respective surfaces surrounded by the antennas 6a and 6a. In the IC chips 5 and 5, a plurality of bumps are provided on mount surfaces and the bumps are electrically connected to lands respectively provided in the prescribed areas on the surfaces of the antenna substrate 6. Specifically, the IC chip 5 is thermocompression-bonded to the land through anisotropic conductive films 7 and 7, for instance, thermocompression-bonded to the prescribed area under the conditions of 180° C. to 250° C. and surface pressure of 800 g. Thus, the IC chip 5 is electrically connected to the prescribed area of the antenna substrate 6. To the IC chips 5 and 5 mounted on the antenna substrate 6, reinforcing plates 9 and 9 made of, for instance, stainless steel are further bonded through adhesives 8 and 8 so that the strength is reinforced. Here, the adhesives 8 and 8 are composed of an epoxy type thermosetting adhesive including the inorganic filler of 10%.

Figure 2:
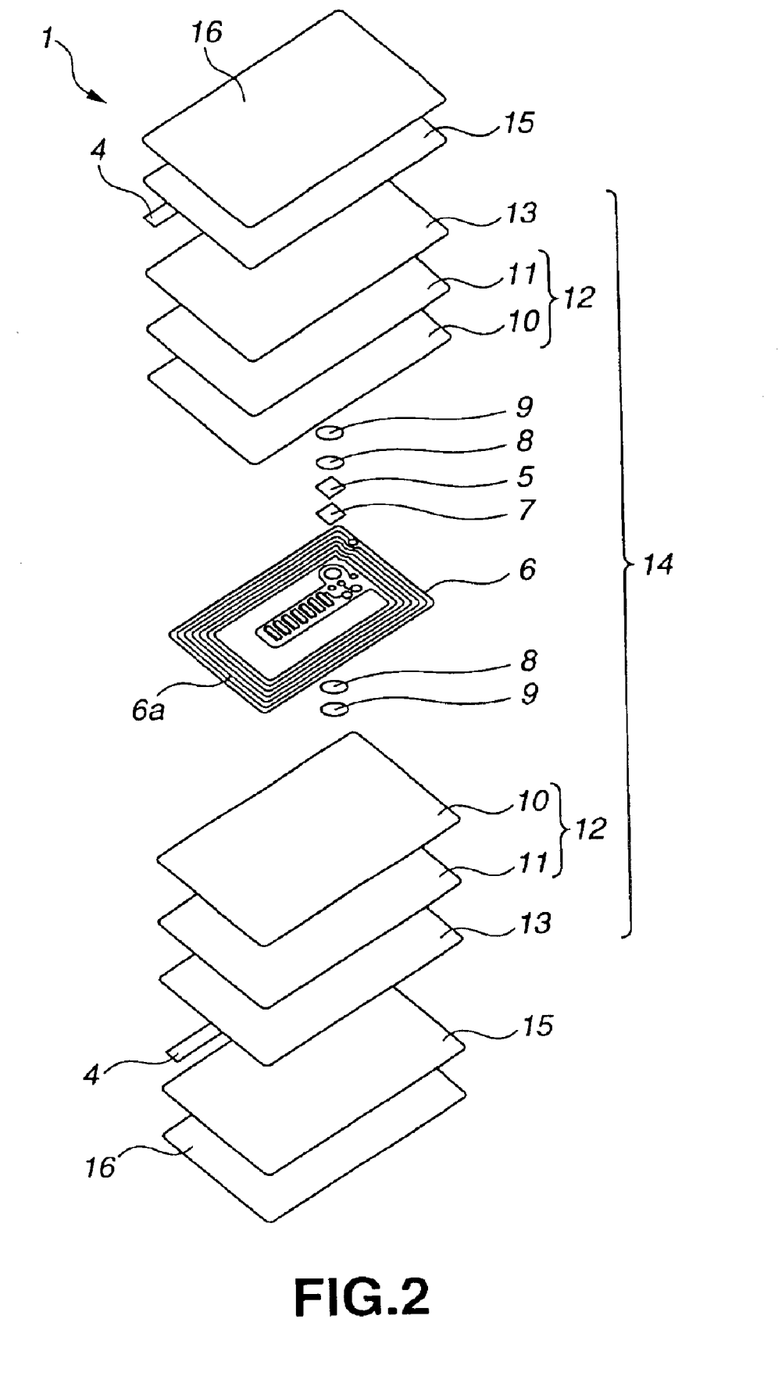
FIG. 2 is an exploded perspective view of the plastic card shown in FIG. 1.

On the surfaces of the antenna substrate 6 on which the IC chips 5 are completely assembled, inner core sheets 10 and 10 and outer core sheets 11 and 11 are respectively laminated. The inner core sheet 10 and the outer core sheet 11 laminated on each surface form a core material 12 described below. Further, on the surfaces of a laminated body that the inner core sheets 10 and 10 and the outer core sheets 11 and 11 are laminated on the antenna substrate 6, sheath materials 13 and 13 are respectively laminated. The laminated body 14 having the sheath materials 13 and 13 laminated is thermocompression-bonded, for instance, at 100° C. to 200° C. under pressure of 1 ton for each card. The integrally laminated body 14 constitutes a basic structural material of the plastic card 1.

Then, on the sheath materials 13 and 13 of the laminated body 14, the magnetic stripes 4 and 4 are provided along the longitudinal directions. Further, on the laminated body 14 that the magnetic stripes 4 and 4 are provided on the sheath materials 13 and 13, screen sheets 15 and 15 for screening the magnetic stripes 4 and 4 are laminated. When magnetic powder is applied to the magnetic stripes 4 and 4, information recorded thereon is visible information. Thus, the screen sheets 15 and 15 make it impossible to decode the information even when the magnetic powder is applied to the magnetic stripes 4 and 4. Further, printing ink layers 16 and 16 are thermocompression-bonded onto the screen sheets 15 and 15.

Figure 3A:
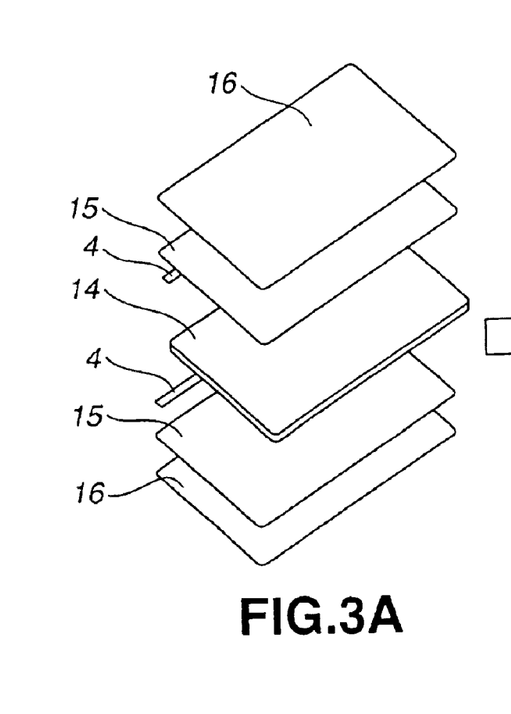
FIG. 3A to FIG. 3C show views for explaining the manufacturing steps of the plastic card shown in FIG. 1.
Figure 3B:
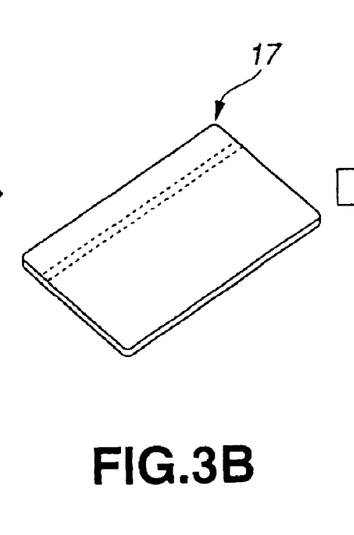
Figure 3C:
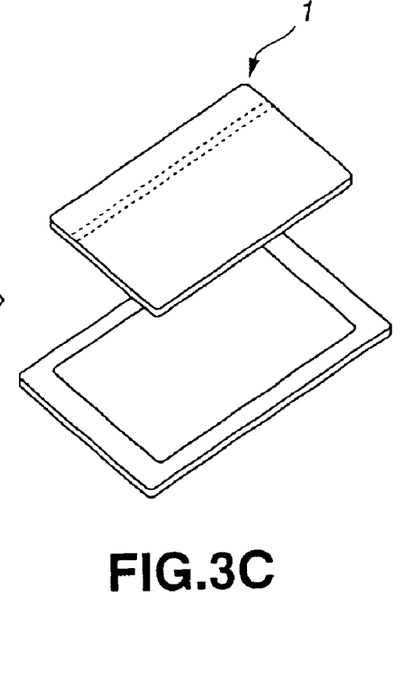

Now, a method for manufacturing the plastic card 1 having such a structure will be described by referring to FIG. 3. The plastic card 1 is manufactured in the following manner. The IC chips 5 are mounted on the antenna substrate 6 and the laminated body 14 that the inner core sheets 10 and 10, the outer core sheets 11 and 11 and the sheath materials 13 and 13 are laminated thereon is formed, as shown in FIG. 3A. Then, as shown in FIG. 3B, the magnetic stripes 4 and 4, the screen sheets 15 and 15 and the printing ink layers 16 and 16 are provided thereon to form a panel 17 on which a plurality of plastic cards 1 are arranged. After that, as shown in FIG. 3C, the panel 17 is punched out to standard size.

In the plastic card 1 constructed as mentioned above, the inner core sheets 10 and 10, the outer core sheets 11 and 11, the sheath materials 13 and 13, the magnetic stripes 4 and 4, the screen sheets 15 and 15 and the printing ink layers 16 and 16 are symmetrically disposed through the antenna substrate 6. Thus, the structure in the direction of thickness is substantially symmetrical so that the thickness in one side of the antenna substrate 6 is substantially the same as the thickness of the other side to prevent the card from being warped.

The printing ink layers 16 and 16 may be interposed between the core materials 12 and 12 and the sheath materials 13 and 13. A printing operation may be, for instance, a silk screen printing. In this case, the ink layers may be disposed in the sides of the core materials 12 and 12 or in the sides of the sheath materials 13 and 13. Further, in this case, the sheath materials 13 and 13 are made of a transparent material to visually recognize printing information.

Figure 4:
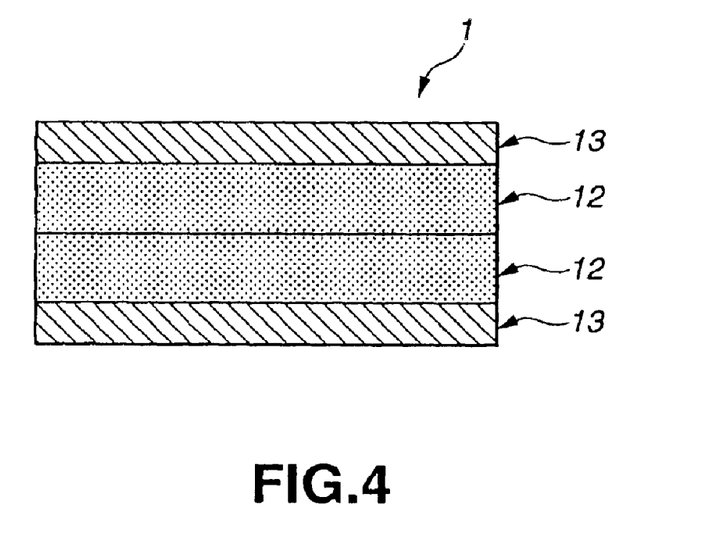
FIG. 4 is a sectional view schematically showing the relation between a core material and a sheath material of the plastic card shown in FIG. 1.

The above-described plastic card 1 is schematically shown in FIG. 4. As shown in FIG. 4, the plastic card 1 comprises a pair of white core materials 12 and 12 and a pair of sheath materials 13 and 13. The pair of core materials 12 located in an inner part are integrally bonded through the antenna substrate 6 not shown in the drawing.

Here, for the core materials 12 and the sheath materials 13, a non-vinyl chloride material is used. Specifically, for the core materials 12 and the sheath materials 13, polyesters such as PET (polyethylene terephthalate), PETG (polyethylene terephthalate copolymer), PBT (polybutylene terephthalate) are employed as well as polycarbonate, ABS (acrylonitrile-butadiene-styrene resin). In addition thereto, polystyrene, polyamide, methyl polymethacrylate, acrylonitrile-styrene copolymer, cellulose propionate, cellulose acetate butylate, etc. may be used. Further, materials obtained by polymer alloying these non-vinyl chlorides may be also employed. For instance, polycarbonate/PETG, polycarbonate/PBT, polycarbonate/ABS, etc. are preferable.

In order to select the materials suitable for the core materials 12 and the sheath materials 13 from among these materials, the breaking elongation and the thickness of the sheet in the tensile test of each material need to be adjusted to a range specified by the present invention. The breaking elongation of the material can be adjusted by controlling the characteristics of the polymer material by blending polymers or copolymerization. In addition thereto, various kinds of addition agents such as inorganic fillers including titanium oxide, talc, calcium carbonate, mica or lubricant are added to the material, so that the breaking elongation of the material can be adjusted. Further, a tensile strength can be improved by drawing the material in biaxial directions in a step for forming a film. For a drawn sheet, PET, PEN (polyethylene naphthalate) etc. are preferable.

Now, Examples and Comparative Examples of the plastic card according to the present invention will be described below. The present invention is not limited to them.

EXAMPLE 1

A screen printing was applied to one surface of a PETG sheet having the thickness of 280 μm to which a filler of 24 wt % composed of talc and titanium oxide was added. The obtained sheet was used as a core material (its breaking elongation was 20%). Further, a drawn PET sheet composed of a polycarbonate/PBT alloy sheet having the thickness of 100 μm was used as a sheath material (its breaking elongation was 130%) (Assuming that the thickness of the sheath material is 10, the ratio of the thickness of the core material was 28).

The above-described core material and a core material having the same structure as that of the above-described core material except that a screen printing is not applied thereto were laminated so that the screen-printed surface was directed outside. The sheath materials were laminated outside both the core materials to have a four-layer structure as shown in FIG. 4. The four-layer structure was thermocompression-bonded at 130° C. The obtained body was punched out to prescribed size so that the plastic card having the thickness of 760 μm was manufactured.

EXAMPLE 2

A plastic card was manufactured in the same manner as that of the Example 1 except that a polyester/polyamide alloy sheet (its breaking elongation was 23%) having the thickness of 280 μm to which a filler of 24 wt % composed of talc and titanium oxide was added was used as a core material.

EXAMPLE 3

A plastic card was manufactured in the same manner as that of the Example 1 except that an ABS sheet (its breaking elongation was 25%) having the thickness of 280 μm to which a filler of 24 wt % composed of talc and titanium oxide was added was used as a core material.

EXAMPLE 4

A plastic card was manufactured in the same manner as that of the Example 1 except that the thickness of a sheet used as a core material was 120 μm and the thickness of a sheet used as a sheath material was 260 μm (Assuming that the thickness of the sheath material is 10, the ratio of the thickness of the core material is 22).

EXAMPLE 5

A plastic card was manufactured in the same manner as that of the Example 1 except that the thickness of a sheet used as a core material was 125 μm and the thickness of a sheet used as a sheath material was 255 μm (Assuming that the thickness of the sheath material is 10, the ratio of the thickness of the core material is 20).

EXAMPLE 6

A plastic card was manufactured in the same manner as that of the Example 1 except that the thickness of a sheet used as a core material was 80 μm and the thickness of a sheet used as a sheath material was 300 μm (Assuming that the thickness of the sheath material is 10, the ratio of the thickness of the core material is 38).

EXAMPLE 7

A plastic card was manufactured in the same manner as that of the Example 1 except that the thickness of a sheet used as a core material was 60 μm and the thickness of a sheet used as a sheath material was 320 μm (Assuming that the thickness of the sheath material is 10, the ratio of the thickness of the core material is 53).

COMPARATIVE EXAMPLE 1

A plastic card was manufactured in the same manner as that of the Example 1 except that a polyester copolymer sheet (its breaking elongation was 27%) having the thickness of 280 μm to which a filler of 15% composed of titanium oxide was added was used as a core material.

COMPARATIVE EXAMPLE 2

A plastic card was manufactured in the same manner as that of the Example 1 except that a polycarbonate/PETG alloy sheet (its breaking elongation was 115%) having the thickness of 280 μm was used as a sheath material.

COMPARATIVE EXAMPLE 3

A plastic card was manufactured in the same manner as that of the Example 1 except that a polycarbonate/PETG alloy sheet (its breaking elongation was 30%) having the thickness of 280 μm to which a filler of 20% composed of talc and titanium oxide was added was used as a core material and a transparent ABS sheet (its breaking elongation was 100%) having the thickness of 100 μm was used as a sheath material.

COMPARATIVE EXAMPLE 4

A plastic card was manufactured in the same manner as that of the Example 1 except that the thickness of a sheet used as a core material was 130 μm and the thickness of a sheet used as a sheath material was 250 μm (Assuming that the thickness of the sheath material is 10, the ratio of the thickness of the core material is 19).

COMPARATIVE EXAMPLE 5

A plastic card was manufactured in the same manner as that of the Example 1 except that the thickness of a sheet used as a core material was 50 μm and the thickness of a sheet used as a sheath material was 330 μm (Assuming that the thickness of the sheath material is 10, the ratio of the thickness of the core material is 66).

In each of the cards manufactured in the above-described Examples 1 to 7 and the Comparative Examples 1 to 5, characters of "8" were stamped 19 times for one line. These characters were stamped in two lines in total by using Embosser DC4600 produced by Datacard Japan Ltd. Then, the warping (mm) of the card was measured. After that, the dynamic bending strength of the card was measured. A method for measuring the warping and the dynamic bending strength of the card was based on JIS-X6305 and the tensile test of the core material and the sheath material (measurement of breaking elongation) was based on ASTM-D638, respectively. The results of them are shown in Table 1.

TABLE 1

| | Breaking Elongation of Core Material (%) | Breaking Elongation of Sheath Material (%) | Ratio of Thickness of Core Material to Thickness 10 of Sheath Material | Warping of Card after Embossing Finish (mm) | Dynamic Bending Strength |
|---|---|---|---|---|---|
| Example 1 | 20 | 130 | 28 | 1.5 | >10000 times |
| Example 2 | 23 | 130 | 28 | 1.7 | >10000 times |
| Example 3 | 25 | 130 | 28 | 1.8 | >10000 times |
| Example 4 | 20 | 130 | 22 | 2.0 | >10000 times |
| Example 5 | 20 | 130 | 20 | 2.0 | >10000 times |
| Example 6 | 20 | 130 | 38 | 1.5 | >10000 times |
| Example 7 | 20 | 130 | 53 | 1.4 | >10000 times |
| Comparative Example 1 | 27 | 130 | 28 | 2.6 | >10000 times |
| Comparative Example 2 | 20 | 115 | 28 | 1.6 | Generation of cracks under 1000 times |
| Comparative Example 3 | 30 | 100 | 28 | 3.0 | Generation of cracks under 1000 times |
| Comparative Example 4 | 20 | 130 | 19 | 2.8 | >10000 times |
| Comparative Example 5 | 20 | 130 | 66 | 1.5 | Generation of cracks under 1000 times |

As apparent from the Table 1, in the Examples 1 to 7, the breaking elongation of the core material was 25% or less and the breaking elongation of the sheath material was 130% or more. Further, assuming that the thickness of the sheath material is 10, the ratio of the thickness of the core material is 20 to 53. The warping of the cards was low as small as 2.0 mm or less and the cards endured dynamic bending tests of 10000 times or more and had high strength to repetitive bending.

As compared therewith, in the Comparative Examples 1 and 3, the breaking elongation of the core material was higher than 25% specified by the present invention. The warping of the cards after an embossing finish was too large (Comparative Example 1: 2.6 mm, Comparative Example 3: 3.0 mm). Further, in the Comparative Example 2, the breaking elongation of the sheath material was lower than 130% specified by the present invention and the dynamic bending strength was insufficient. Accordingly, in the Comparative Examples 1 to 3, embossing characteristics could not be made compatible with repetitive bending strength.

The lower limit of the breaking elongation of the core material is preferably 20%, because when the breaking elongation of the core material is less than 20%, the dynamic bending strength is deteriorated or the warping of the card after the embossing finish is increased. Further, when the breaking elongation of the sheath material is 130% or more, there is no upper limit especially, because, as the breaking elongation of the sheath material is increased, the dynamic bending strength can be improved and the warping of the card after embossing finish can be decreased.

Further, in the Comparative Examples 4 and 5, the breaking elongation of the core material was 25% or less and the breaking elongation of the sheath material was 130% or more. Even in this case, the ratio of the thickness of the core material to the thickness 10 of the sheath material deviated from a range of 20 to 53. In the Comparative Examples 4 and 5, either the embossing characteristics or the repetitive bending strength was deteriorated, so that the embossing characteristics could not be made compatible with the repetitive bending strength.

EXAMPLE 8

A screen printing was applied to one surface of a polycarbonate/PETG alloy sheet having the thickness of 330 μm to which a filler of 20 wt % composed of talc and titanium oxide was added. The obtained sheet was used as a core material (its breaking elongation was 40%). Further, a drawn PET sheet having the thickness of 50 μm to which an adhesive treatment was applied upon forming a film was used as a sheath material (its tensile strength was 120 MPa) (Assuming that the thickness of the sheath material is 10, the ratio of the thickness of the core material is 66).

The above-described core material and a core material having the same structure as that of the above-described core material except that a screen printing is not applied thereto were laminated so that the screen-printed surface was directed outside. The sheath materials were laminated outside both the core materials to have a four-layer structure as shown in FIG. 4. The four-layer structure was thermocompression-bonded at 130° C. The obtained body was punched out to prescribed size so that the plastic card having the thickness of 760 μm was manufactured.

EXAMPLE 9

A plastic card was manufactured in the same manner as that of the Example 1 except that a translucent drawn PET sheet (its tensile strength was 120 MPa) having the thickness of 50 μm to which a filler made of silica was added was used as a sheath material.

EXAMPLE 10

A plastic card was manufactured in the same manner as that of the Example 1 except that an ABS sheet (its breaking elongation was 50%) having the thickness of 330 μm was used as a core material.

EXAMPLE 11

A plastic card was manufactured in the same manner as that of the Example 1 except that the thickness of a sheet used as a core material was 342 μm and the thickness of a sheet used as a sheath material was 38 μm (Assuming that the thickness of the sheath material is 10, the ratio of the thickness of the core material is 90).

EXAMPLE 12

A plastic card was manufactured in the same manner as that of the Example 1 except that the thickness of sheets used as core materials was 305 μm and the thickness of sheets used as sheath materials was 75 μm (Assuming that the thickness of the sheath material is 10, the ratio of the thickness of the core material is 41).

COMPARATIVE EXAMPLE 6

A plastic card was manufactured in the same manner as that of the Example 8 except that a polyester copolymer sheet (its breaking elongation was 55%) having the thickness of 50 μm to which a filler of 15% composed of titanium oxide was added was used as a core material.

COMPARATIVE EXAMPLE 7

A plastic card was manufactured in the same manner as that of the Example 8 except that a polycarbonate sheet (its tensile strength was 95 MPa) having the thickness of 330 μm was used as a sheath material.

COMPARATIVE EXAMPLE 8

A plastic card was manufactured in the same manner as that of the Example 8 except that an alloy sheet made of polycarbonate of 70%/PETG of 30% (its breaking elongation was 60%) having the thickness of 50 μm to which a filler of 20% composed of talc and titanium oxide was added was used as a core material and a transparent ABS sheet (its tensile strength was 80 MPa) having the thickness of 330 μm was used as a sheath material.

COMPARATIVE EXAMPLE 9

A plastic card was manufactured in the same manner as that of the Example 8 except that the thickness of a sheet used as a core material was 300 μm and the thickness of a sheet used as a sheath material was 80 μm (Assuming that the thickness of the sheath material is 10, the ratio of the thickness of the core material is 38).

COMPARATIVE EXAMPLE 10

A plastic card was manufactured in the same manner as that of the Example 1 except that the thickness of a sheet used as a core material was 345 μm and the thickness of a sheet used as a sheath material was 35 μm (Assuming that the thickness of the sheath material is 10, the ratio of the thickness of the core material is 99.).

In each of the cards manufactured in the above-described Examples 8 to 12 and the Comparative Examples 6 to 10, characters of "8" were stamped 19 times for one line. These characters were stamped in two lines in total by using Embosser DC-4600 produced by Datacard Japan Ltd. Then, the protruding height (mm) of the characters and the warping (mm) of the card were measured. After that, the dynamic bending strength of the card was measured. A method for measuring the height of the characters, and the warping and the dynamic bending strength of the card was based on JIS-X6305 and the tensile test of the core material and the sheath material was based on ASTM-D638, respectively. The results of them are shown in Table 2.

TABLE 2

|  | Breaking Elongation of Core Material (%) | Tensile Strength of Sheath Material (MPa) | Ratio of Thickness of Core Material to Thickness 10 of Sheath Material | Height of Embossed Character (mm) | Warping of Embossed Card (mm) | Dynamic Bending Strength |
| --- | --- | --- | --- | --- | --- | --- |
| Example 8 | 40 | 120 | 66 | 0.44 | 1.3 | >10000 times |
| Example 9 | 40 | 100 | 66 | 0.45 | 1.4 | >10000 times |
| Example 10 | 50 | 120 | 66 | 0.44 | 1.8 | >10000 times |
| Example 11 | 40 | 120 | 90 | 0.46 | 1.9 | >10000 times |
| Example 12 | 40 | 120 | 41 | 0.40 | 1.2 | >10000 times |
| Comparative Example 6 | 55 | 120 | 66 | 0.42 | 2.6 | >10000 times |
| Comparative Example 7 | 40 | 95 | 66 | 0.45 | 1.6 | Generation of cracks under 1000 times |
| Comparative Example 8 | 60 | 80 | 66 | 0.44 | 3.0 | Generation of cracks under 1000 times |
| Comparative Example 9 | 40 | 120 | 38 | 0.38 | 1.2 | >10000 times |
| Comparative Example 10 | 40 | 120 | 99 | 0.46 | 2.0 | Generation of cracks under 1000 times |

As apparent from the Table 2, in the Examples 8 to 12, the breaking elongation of the core material was 50% or less and the tensile strength of the sheath material was 100 MPa or more. Further, assuming that the thickness of the sheath material is 10, the ratio of the thickness of the core material is 41 to 90. The warping of the cards by embossing was low (1.2 to 1.9 mm) and the strength to a repetitive bending was also high.

As compared therewith, in the Comparative Examples 6 and 8, the breaking elongation of the core material was higher than 50%. The warping of the cards after an embossing finish was too large such as 2.6 mm and 3.0 mm. On the other hand, in the Comparative Example 7, the tensile strength of the sheath material was less than 100 MPa. The warping of the card after an embossing finish could be decreased as small as 1.6 mm. However, the dynamic bending strength was insufficient. Consequently, in the Comparative Examples 6 to 8, when the embossed card was small in warping, the dynamic bending strength was insufficient (Comparative Example 7). When the dynamic bending strength was sufficient, the warping of the embossed card was large (Comparative Example 6), or when the dynamic bending strength was decreased, the warping of the card was large (Comparative Example 8). In any of these Examples, the embossing characteristics could not be made compatible with the repetitive bending strength.

The lower limit of the breaking elongation of the core material is preferably 40%, because when the breaking elongation of the core material is less than 40%, the dynamic bending strength is deteriorated or the warping of the card after the embossing finish is increased. Further, when the tensile strength of the sheath material is 100 MPa or more, there is no upper limit especially, because, as the breaking elongation of the sheath material is increased, the dynamic bending strength can be improved and the warping of the card after embossing can be decreased.

Further, even when the breaking elongation of the core material was 25% or less and the breaking elongation of the sheath material was 130% or more, the embossing characteristics could not be made compatible with the repetitive bending strength in the Comparative Examples 9 and 10. Assuming that the thickness of the sheath material is 10, the ratio of the thickness of the core material deviates from a range of 41 to 90 in the Comparative Examples 9 and 10. Particularly, in the Comparative Example 9 in which assuming that the thickness of the sheath material is 10, the ratio of the thickness of the core material was smaller than 41, the height of embossed characters did not satisfy a standard (0.40 mm or larger).

INDUSTRIAL APPLICABILITY

As apparent from the above description, in the plastic card according to the present invention, the breaking elongation of the core material is 25% or less and the breaking elongation of the sheath material is 130% or more. The thickness of the core material to the thickness 10 of the sheath material occupied in the entire part of the card is located within a range of 20 to 53. Further, in the plastic card according to the present invention, the breaking elongation of the core material is 50% or less and the tensile strength of the sheath material is 100 MPa or more. The thickness of the core material to the thickness 10 of the sheath material occupied in all the part of the card is located within a range of 41 to 90. Such a card is not warped even when embossed characters are stamped thereon. Further, since the card is high in its repetitive bending strength, the card can be prevented from cracking during its actual use.

What is claimed is:

1. A plastic card comprising:
   a core material having at least one core sheet;
   and a sheath material having at least one sheath sheet,
   wherein a breaking elongation of the core material is 25% or less, wherein a breaking elongation of the sheath material is 130% or more, wherein the core material and the sheath material include at least one of a non-vinyl chloride resin and a polymer alloy of a non-vinyl chloride resin and are thermocompression bonded, and wherein the ratio of the total thickness of the at least one core sheet relative to the total thickness of the at least one sheath sheet (20 to 53):10.

2. The plastic card according to claim 1, wherein the core material has at least a pair of core sheets bonded through a circuit board and the sheath material has at least a pair of outer layer sheath sheets bonded through the core material.

3. The plastic card according to claim 2, wherein at least the one pair of core sheets and at least the one pair of outer layer sheath sheets are symmetrically disposed on the circuit board located as a center.

4. The plastic card according to claim 1, wherein the core material and the sheath material are made of a non-vinyl chloride resin or a polymer alloy of a non-vinyl chloride resin including inorganic filler.

5. The plastic card according to claim 1, wherein an embossing finish is applied to the sheath material.

6. The plastic card according to claim 1, wherein a magnetic stripe is provided on the sheath material.

7. The plastic card according to claim 1, wherein integrated circuit chips are provided in the core material.

8. A plastic card comprising:
   a core material layer provided on each of the opposing face surfaces of a circuit board; and
   a sheath material layer provided outside of each of the core material layers,
   wherein each of the core material layers and the sheath material layers is made of a material a non-vinyl chloride resin or a polymer alloy of a non-vinyl chloride resin to which inorganic filler is added, wherein the core material layers and the sheath material layers include at least one of a non-vinyl chloride resin and a polymer alloy of a non-vinyl chloride resin and are thermocompression bonded, and wherein the sheath material layers have a total thickness that is thinner than the total thickness of the core material layers and have a breaking elongation higher than that of the core material layres, and wherein an embossing finish applied.

9. The plastic card according to claim 8, wherein the core material layer and the sheath material layer provided on one surface side and the core material layer and the sheath material layer provided on the other surface side are symmetrically provided on the circuit board located as a center.

10. The plastic card according to claim 8, wherein a magnetic stripe is provided on the sheath material layer.

11. The plastic card according to claim 8, wherein integrated circuit chips are provided on the core material layer.

12. A plastic card comprising:
    a core material having at least one core sheet; and
    a sheath material having at least one sheath sheet,
    wherein a breaking elongation of the core material is 50% or less, wherein a tensile strength of the sheath material is 100 MPa or more, wherein the core material and the sheath material include at least one of a non-vinyl chloride resin and a polymer alloy of a non-vinyl chloride resin and are thermocompression bonded, and wherein the ratio of the total thickness of the at least one core sheet relative to the total thickness of the at least one sheath sheet is (41 to 90):10.

13. The plastic card according to claim 12, wherein the core material has at least a pair of core sheets bonded through a circuit board and the sheath material has at least a pair of outer layer sheath sheets bonded through the core material.

14. The plastic card according to claim 13, wherein at least the one pair of core sheets and at least the one pair of outer layer sheath sheets are symmetrically disposed on the circuit board located as a center.

15. The plastic card according to claim 12, wherein the core material and the sheath material are made of a non-vinyl chloride resin or a polymer alloy of a non-vinyl chloride resin.

16. The plastic card according to claim 15, wherein the core material is made of a non-vinyl chloride resin or a polymer alloy of a non-vinyl chloride resin including an inorganic filler and the sheath material is composed of a drawn sheet made of the non-vinyl chloride resin or the polymer alloy of the non-vinyl chloride resin.

17. The plastic card according to claim 12, wherein an embossing finish is applied to the sheath material.

18. The plastic card according to claim 12, wherein a magnetic stripe is provided on the sheath material.

19. The plastic card according to claim 12, wherein integrated circuit chips are provided on the core material.

* * * * *